(12) United States Patent
Lee et al.

(10) Patent No.: US 8,223,290 B2
(45) Date of Patent: Jul. 17, 2012

(54) LIQUID CRYSTAL DISPLAY WITH ONE OF SUBPIXEL ELECTRODES BEING OFFSET WITH RESPECT TO OTHER

(75) Inventors: Seong-Young Lee, Anyang-si (KR); Seung-Soo Baek, Seoul (KR); Yun-Jung Cho, Asan-si (KR); Young-Goo Song, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 428 days.

(21) Appl. No.: 12/512,216

(22) Filed: Jul. 30, 2009

(65) Prior Publication Data

US 2010/0079690 A1    Apr. 1, 2010

(30) Foreign Application Priority Data

Sep. 29, 2008    (KR) .................. 10-2008-0095332

(51) Int. Cl.
*G02F 1/136* (2006.01)
*G02F 1/1343* (2006.01)
*G09G 3/36* (2006.01)
*H01L 29/04* (2006.01)

(52) U.S. Cl. ............. 349/48; 349/42; 349/43; 349/142; 349/143; 349/144; 345/92; 345/103; 257/59; 257/72

(58) Field of Classification Search ............. 349/42–47, 349/141–144; 257/59, 72; 345/92, 103
See application file for complete search history.

(56) References Cited

U.S. PATENT DOCUMENTS

| | | | | |
|---|---|---|---|---|
| 5,870,075 A * | 2/1999 | Yamazaki et al. | ............. | 345/92 |
| 6,028,577 A * | 2/2000 | Sakamoto | ............. | 345/92 |
| 6,760,082 B2 * | 7/2004 | Lee | ............. | 349/42 |
| 2005/0099377 A1 * | 5/2005 | Kim | ............. | 345/98 |
| 2005/0253797 A1 * | 11/2005 | Kamada et al. | ............. | 345/89 |
| 2007/0132900 A1 | 6/2007 | Lee | | |
| 2008/0049156 A1 * | 2/2008 | Kim et al. | ............. | 349/40 |
| 2009/0002588 A1 * | 1/2009 | Lee et al. | ............. | 349/42 |
| 2009/0310075 A1 * | 12/2009 | Kim | ............. | 349/144 |

FOREIGN PATENT DOCUMENTS

| | | |
|---|---|---|
| JP | 09-022023 A | 1/1997 |
| KR | 1020040076721 A | 9/2004 |
| KR | 1020040084443 A | 10/2004 |
| KR | 1020040084444 A | 10/2004 |
| KR | 1020050041356 A | 5/2005 |
| KR | 1020060062163 A | 6/2006 |
| KR | 1020070088044 A | 8/2007 |
| KR | 1020070102125 A | 10/2007 |

* cited by examiner

*Primary Examiner* — Hoan C Nguyen
(74) *Attorney, Agent, or Firm* — Cantor Colburn LLP (57) ABSTRACT

A liquid crystal display includes a substrate, a plurality of a gate line and a plurality of a data line disposed on the substrate, a plurality of a thin film transistor each connected to a gate line and a data line, a plurality of a pixel electrode each connected to a thin film transistor, a common electrode facing the pixel electrodes, and a liquid crystal layer between the pixel electrodes and the common electrode. Each of the pixel electrodes includes a first longitudinal edge adjacent to a first data line and a second longitudinal edge adjacent to a second data line adjacent to the first data line. A first distance between an edge of the first longitudinal edge and the first data line is larger than a second distance between the second longitudinal edge and an edge of the second data line.

16 Claims, 11 Drawing Sheets

LIQUID CRYSTAL DISPLAY WITH ONE OF SUBPIXEL ELECTRODES BEING OFFSET WITH RESPECT TO OTHER

This application claims priority to Korean Patent Application No. 10-2008-0095332 filed on Sep. 29, 2008, and all the benefits accruing therefrom under 35 U.S.C. §119, the entire contents of which are incorporated herein by reference.

BACKGROUND OF THE INVENTION (a) Field of the Invention

The present invention relates to a liquid crystal display.

(b) Description of the Related Art

A liquid crystal display ("LCD") is one of the most widely used flat panel displays ("FPD"). A LCD is composed of two display panels on which field generating electrodes are formed, and a liquid crystal layer interposed between the two display panels. A voltage is applied to the field generating electrodes to generate an electric field on the liquid crystal layer, the orientation of liquid crystal molecules of the liquid crystal layer is determined, and the polarization of incident light is controlled through the generated electric field to display images.

Among the LCDs, a vertical alignment ("VA") mode LCD, which aligns LC molecules such that the long axes of the LC molecules are perpendicular to the panels in the absence of an electric field, is spotlighted because of its relatively high contrast ratio and wide reference viewing angle.

The wide viewing angle of the VA mode LCD can be realized by cutouts in the field-generating electrodes and/or protrusions on the field-generating electrodes. Since the cutouts and the protrusions can determine the tilt directions of the LC molecules, the tilt directions can be distributed in several directions by using the cutouts and the protrusions such that the reference viewing angle is widened.

Also, a technique in which one pixel electrode is divided into two subpixel electrodes, and high and low voltages are respectively applied to the subpixel electrodes to form the different alignment directions of the liquid crystal molecules corresponding to the two subpixel electrodes, thereby improving visibility in right and left viewing angle directions, has been developed.

BRIEF SUMMARY OF THE INVENTION

In a liquid crystal display ("LCD"), where one pixel electrode is divided into two subpixel electrodes, and high and low voltages are respectively applied to the subpixel electrodes to form the different alignment directions of the liquid crystal molecules corresponding to the two subpixel electrodes, there may be technical challenges in operating and/or forming the LCD. For example, the pixel electrode applied with the high voltage may generate crosstalk due to parasitic capacitance between the data line and the pixel electrode, thereby decreasing the display quality.

An exemplary embodiment of the present invention provides a liquid crystal display having an excellent display quality, by reducing the crosstalk due to parasitic capacitance.

An exemplary embodiment of a liquid crystal display according to the present invention includes an insulation substrate, a plurality of a gate line and a data line disposed on the insulation substrate and intersecting each other, a plurality of a thin film transistor connected to a gate line and a data line, a plurality of a pixel electrode each connected to a thin film transistor. The each pixel electrode includes a first longitudinal edge adjacent to a first data line connected to a first thin film transistor of a pixel area, and a second longitudinal edge adjacent to a second data line connected to a second thin film transistor of a neighboring pixel area. A first distance between the first longitudinal edge and an edge of the first data line is larger than a second distance between the second longitudinal edge and an edge of the second data line, and is less than about two times the second distance.

The polarity of the signal voltage applied to the data line may be changed per one frame.

The pixel electrode may be symmetrical with respect to a longitudinal central line of the pixel area.

The pixel electrode may comprise a first subpixel electrode and a second subpixel electrode.

The first subpixel electrode and the second subpixel electrode may be respectively input with voltages having different polarities.

Two neighboring first subpixel electrodes in a row direction may be input with voltages having different polarities.

A longitudinal central line of the first subpixel electrode may be unmatched with a longitudinal central line of the second subpixel electrode.

The first distance may be a distance between the first longitudinal edge of the first subpixel electrode and the edge of the first data line, and the second distance may be a distance between the second longitudinal edge of the first subpixel electrode and the edge of the second data line adjacent to the first data line.

A difference between the voltage input to the first subpixel electrode and the reference voltage input to the common electrode, may be larger than a difference between the voltage input to the second subpixel electrode and the reference voltage input to the common electrode.

An area of the second subpixel electrode may be larger than an area of the first subpixel electrode, and may be in a range of 1 to 2 times the area of the first subpixel electrode.

The pixel electrode may include a plurality of a minute branch.

The thin film transistor may include a first thin film transistor connected to the first subpixel electrode, and a second thin film transistor connected to the second subpixel electrode. The first and second thin film transistors may be both connected to the same gate line, but connected to different data lines.

The first subpixel electrode and the second subpixel electrode may include a plurality of a minute branch.

The first distance may be more than approximately 6 micrometers (μm).

An exemplary embodiment of a liquid crystal display includes a first substrate including a plurality of a pixel area, a plurality of a gate line and a plurality of a data line disposed on the first substrate and intersecting each other, a plurality of a thin film transistor each connected to a gate line and a data line, a plurality of a pixel electrode disposed on the first substrate, each pixel electrode connected to a thin film transistor, disposed substantially symmetrical with respect to adjacent data lines and including a first subpixel electrode and a second subpixel electrode, a common electrode disposed on a second substrate and facing the pixel electrodes, and a liquid crystal layer interposed between the pixel electrodes and the common electrode. The first subpixel electrode includes a first longitudinal edge extending in the longitudinal direction and disposed adjacent to a first data line connected to a first thin film transistor of a first pixel area, and a second longitudinal edge extending in the longitudinal direction and disposed adjacent to a second data line adjacent to the first data line. The second data line is connected to a second thin film transistor of a second pixel area, the first and second pixel areas adjacent to each other in a transverse direction substantially perpendicular to the longitudinal direction. A first distance between the first longitudinal edge and an edge of the first data line is larger than a second distance between the second longitudinal edge and an edge of the second data line, and is less than two times the second distance. A second subpixel electrode is adjacent to the first subpixel electrode in a longitudinal direction of the each pixel electrode and disposed substantially symmetrical with respect to the adjacent data lines.

An exemplary embodiment of the present invention includes the pixel electrode divided into the first and second subpixel electrodes respectively driven to represent different gamma curves, such that the visibility of the liquid crystal display is improved.

An exemplary embodiment of the present invention includes the distances between the first subpixel electrode and the right and left neighboring data lines being different from each other, such that deterioration of the display quality due to lateral crosstalk may be prevented.

An exemplary embodiment of a liquid crystal display provides excellent optical characteristics.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the thickness of layers, films, panels, regions, etc., are exaggerated for clarity.

Like reference numerals designate like elements throughout the specification. As used herein, the term "and/or" includes any and all combinations of one or more of the associated listed items.

It will be understood that when an element such as a layer, film, region, or substrate is referred to as being "on" or "connected to" another element, the element can be directly on or connected to the other element or intervening elements may also be present. In contrast, when an element is referred to as being "directly on" or "directly connected to" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "over", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
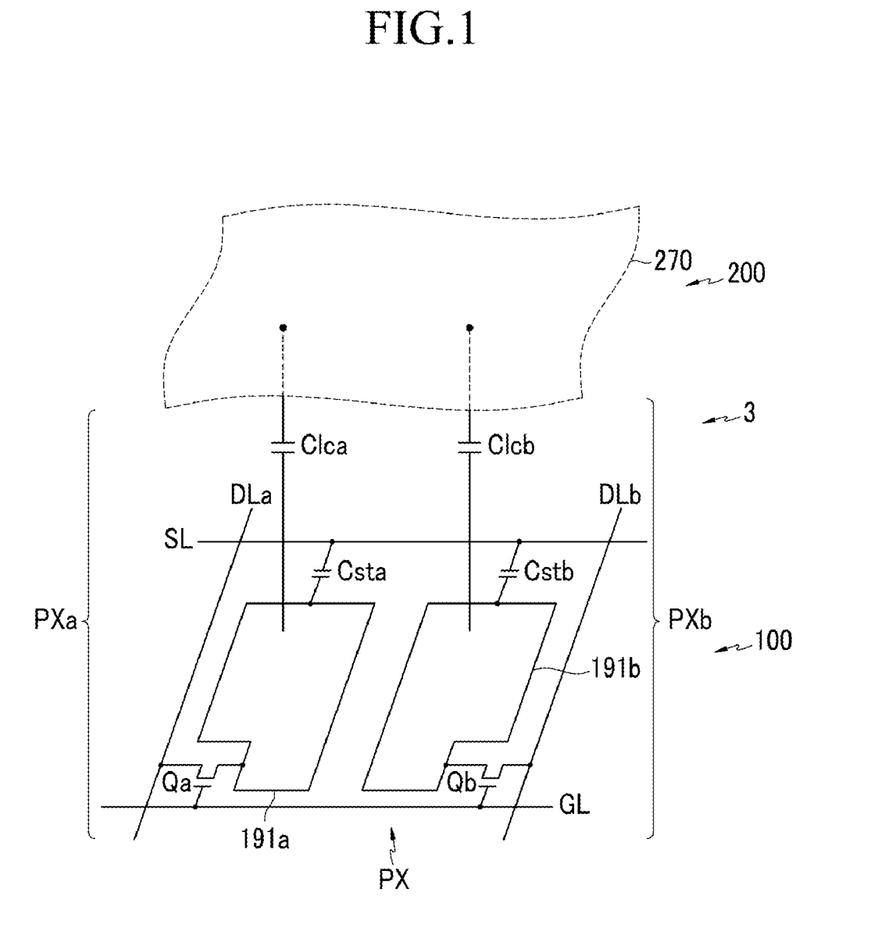
FIG. 1 is an equivalent circuit diagram of an exemplary embodiment of one pixel of a liquid crystal display, according to the present invention.

FIG. 1 is an equivalent circuit diagram of one pixel of a liquid crystal display according to an exemplary embodiment of the present invention.

Referring to FIG. 1, a liquid crystal display according to an exemplary embodiment of the present invention includes signal lines including a plurality of a gate line GL, a plurality of a pair of data lines DLa and DLb, a plurality of a storage electrode line SL, and a plurality of a pixel PX electrically connected to the signal lines. The liquid crystal display includes a lower panel 100 and an upper panel 200 facing each other, and a liquid crystal layer 3 interposed therebetween. Each pixel may substantially correspond to a pixel area.

Each pixel PX includes a pair of subpixels PXa and PXb. Each subpixel PXa/PXb includes a switching element Qa/Qb, a liquid crystal capacitor Clca/Clcb, and a storage capacitor Csta/Cstb, respectively.

Each switching element Qa/Qb may be a three-terminal element, such as a thin film transistor, provided on the lower panel 100. The switching element Qa/Qb may include a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb uses a subpixel electrode 191a/191b and a common electrode 270 as two terminals. The liquid crystal layer 3 between electrode 191a and 270, and between electrode 191b and 270, functions as a dielectric material.

The storage capacitor Csta/Cstb, is an auxiliary capacitor for the liquid crystal capacitor Clca/Clcb. The storage capacitor Csta/Cstb includes the subpixel electrode 191a/191b, and a storage electrode line SL provided on the lower display panel 100 overlaps the subpixel electrode 191a/191b via an insulator. The separate storage electrode line SL is supplied with a predetermined voltage such as the common voltage Vcom.

A predetermined difference is generated between voltages charged to two liquid crystal capacitors Clca and Clcb. In one exemplary embodiment, the data voltage applied to the liquid crystal capacitor Clca is less or more than the data voltage applied to the liquid crystal capacitor Clcb. Therefore, when the voltages of the first and second liquid crystal capacitors Clca and Clcb are appropriately adjusted, it is possible to make images viewed from the side be as similar as possible to images viewed from the front. Advantageously, it is possible to improve the side visibility.

Next, a liquid crystal display according to an exemplary embodiment of the present invention will be described in detail with reference to FIG. 2 to FIG. 5.

Figure 2:
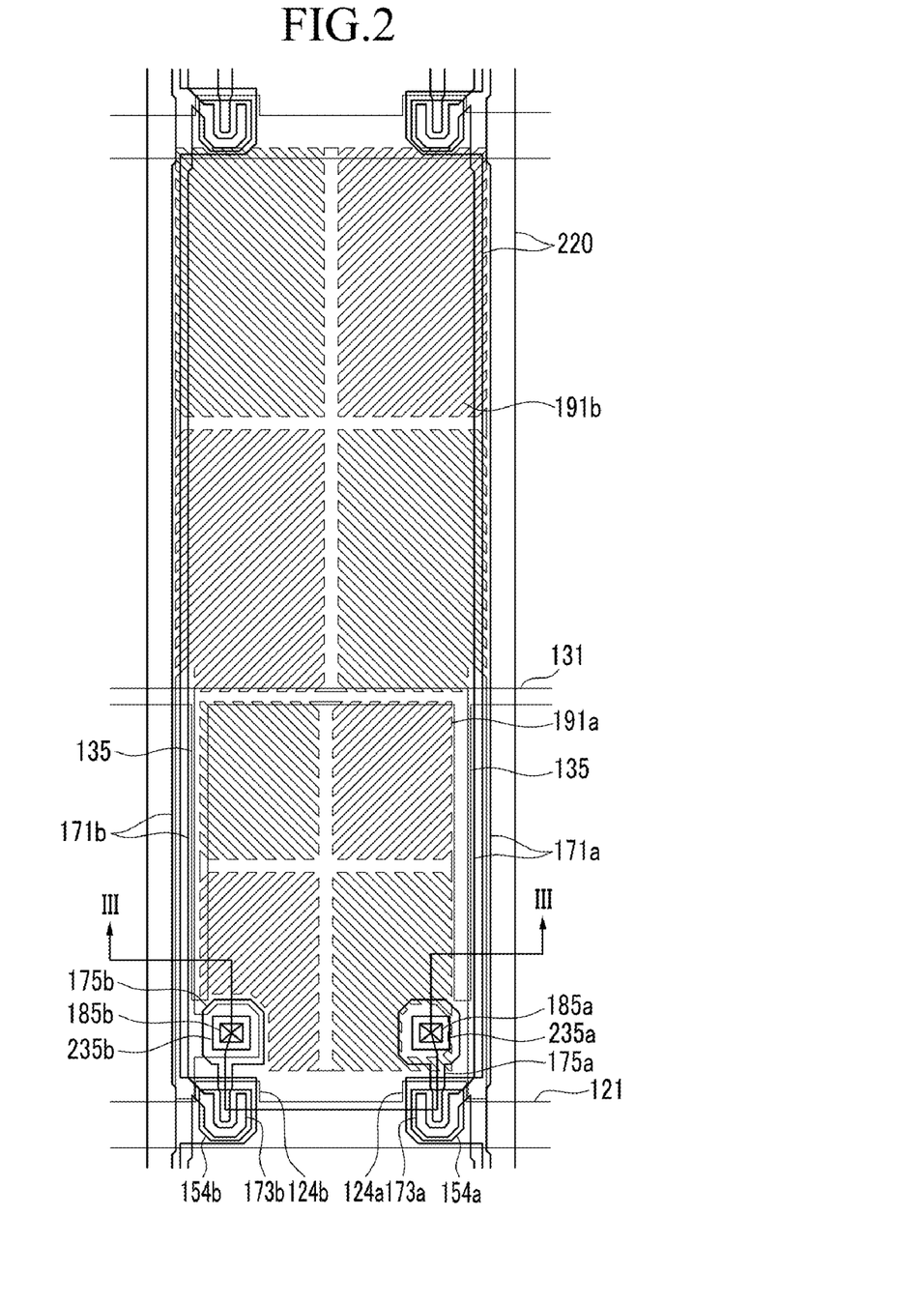
FIG. 2 is a layout view of an exemplary embodiment of a liquid crystal display, according to the present invention.
Figure 3:
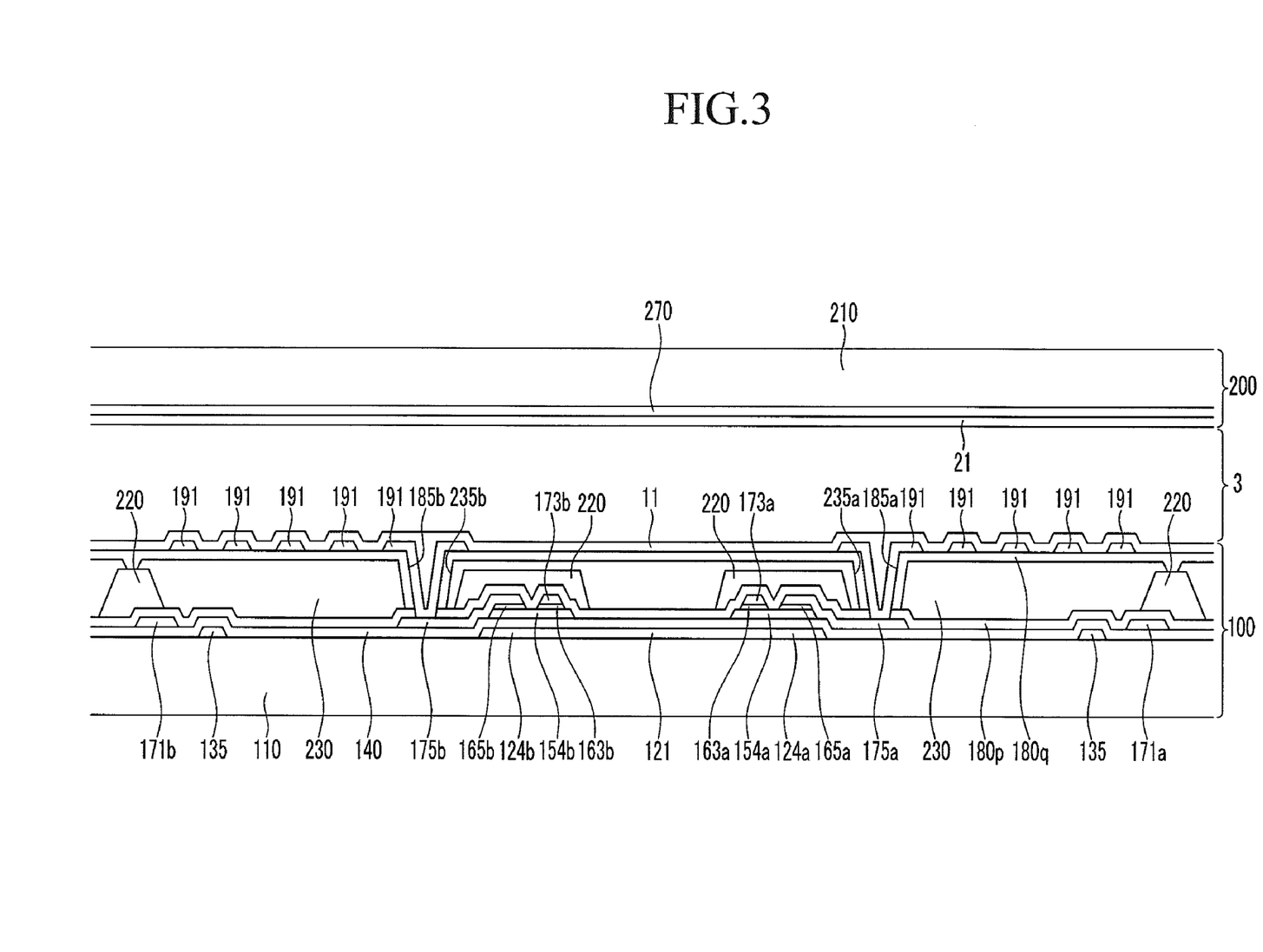
FIG. 3 is a cross-sectional view of the liquid crystal display of FIG. 2 taken along line III-III.
Figure 4:
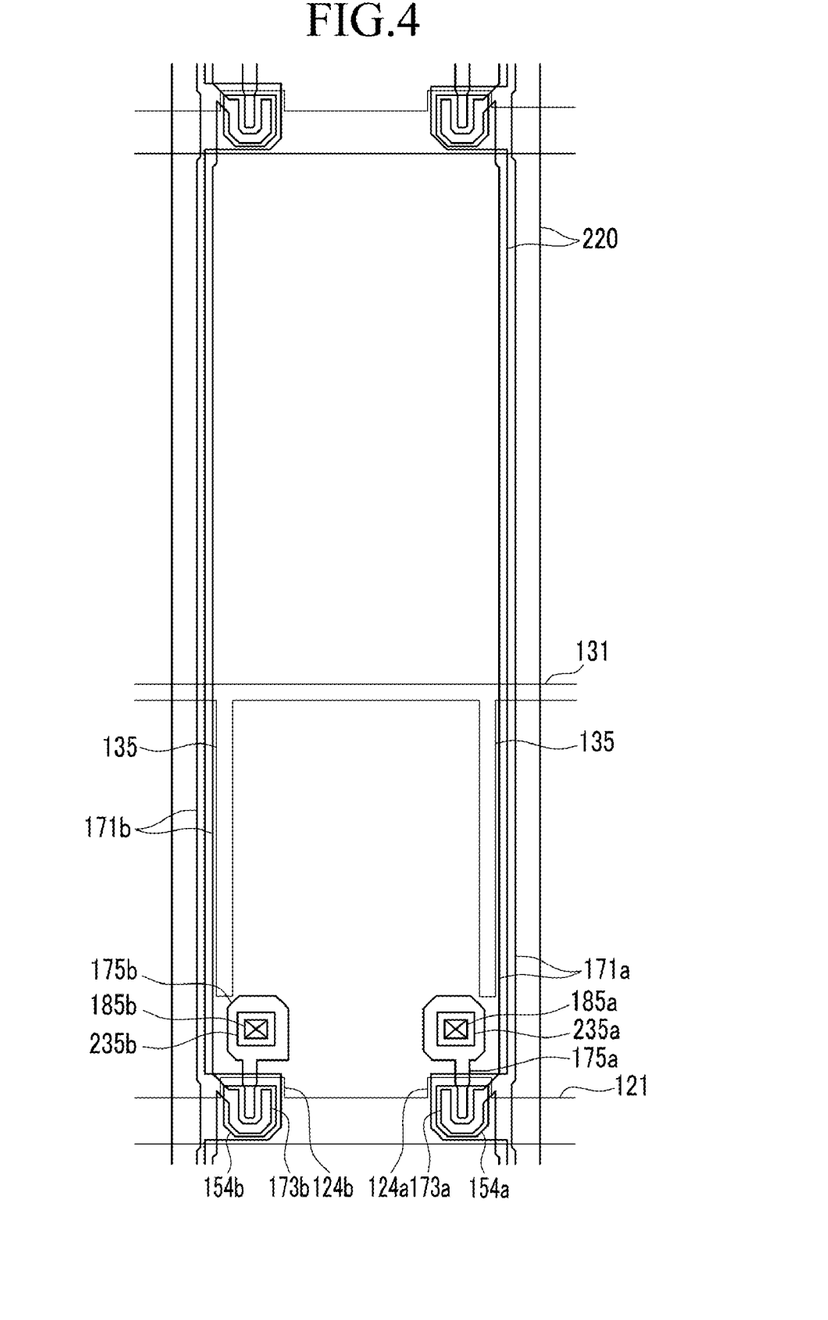
FIG. 4 is a layout view of the liquid crystal display of FIG. 2, except for the pixel electrode.
Figure 5:
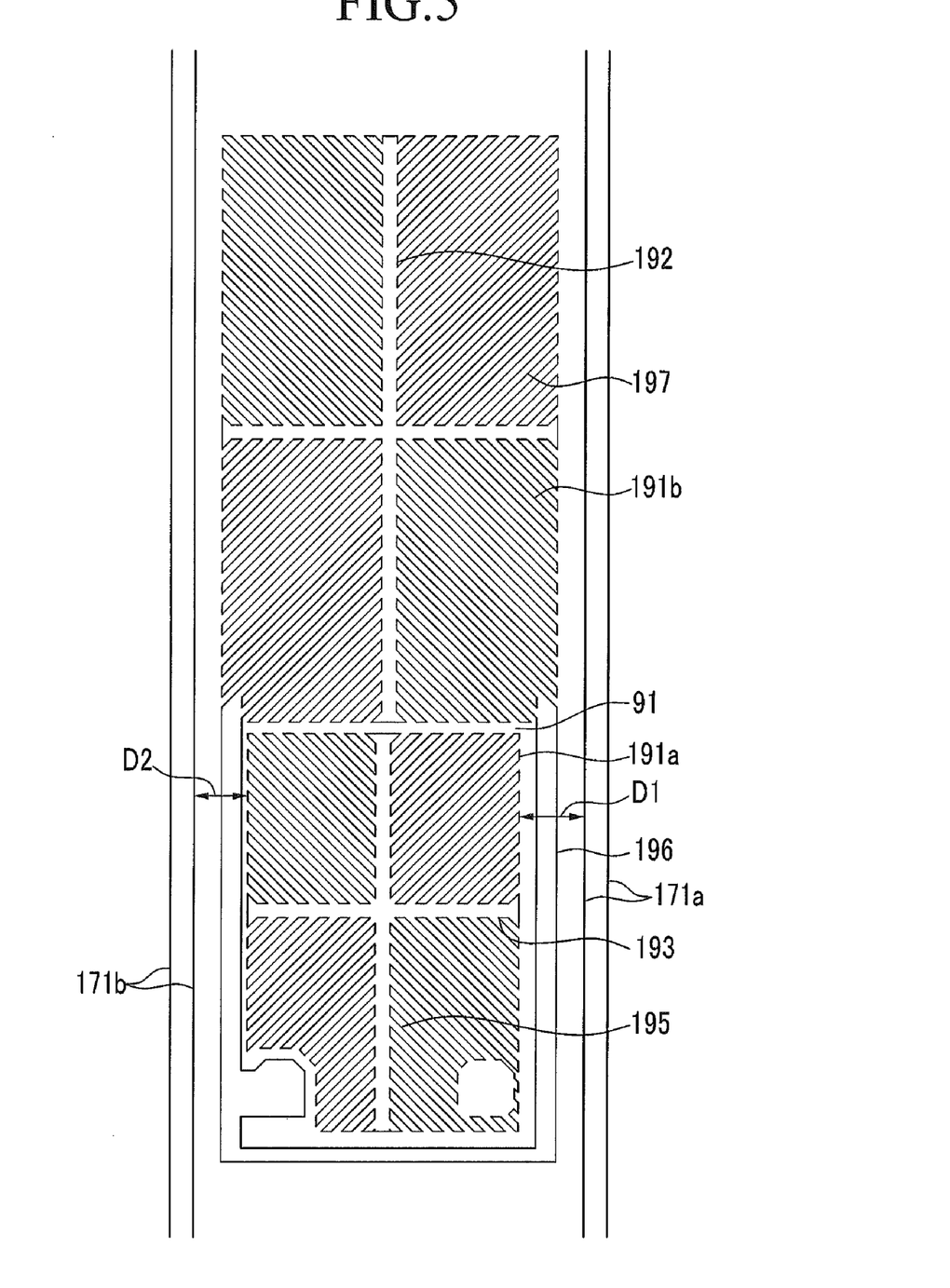
FIG. 5 is a top plan view of the pixel electrode and the data line in the liquid crystal display of FIG. 2.
Figure 6:
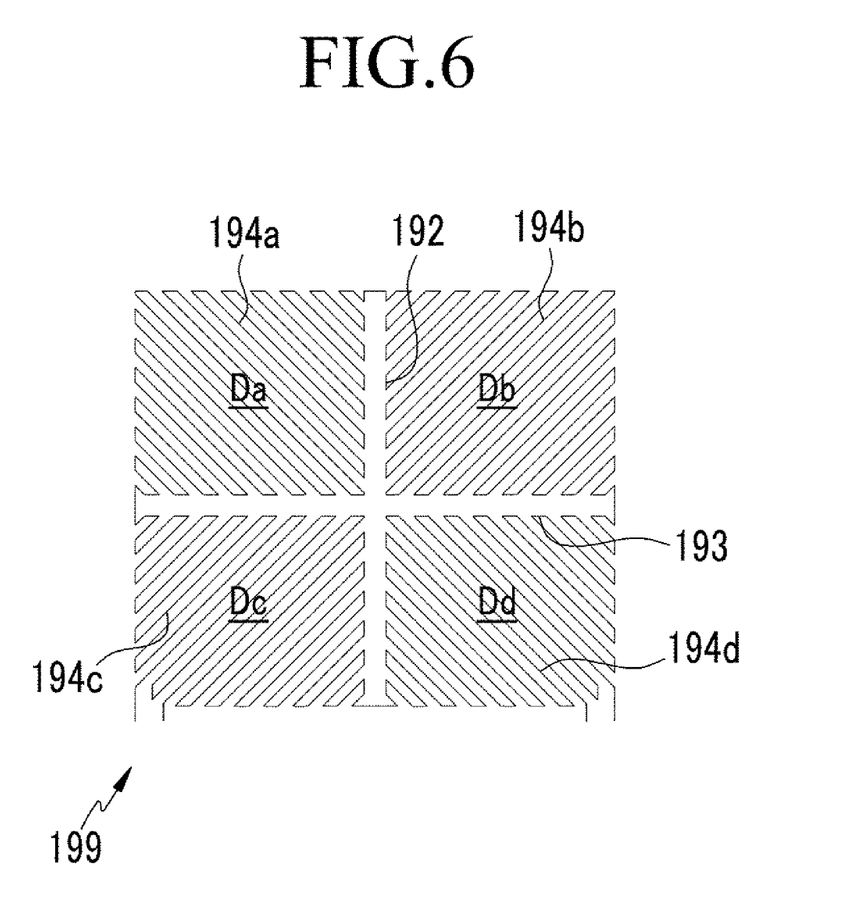
FIG. 6 is a top plan view of an exemplary embodiment of a base electrode of a pixel electrode, according to the present invention.

FIG. 2 is a layout view of an exemplary embodiment of a liquid crystal display according to the present invention, FIG. 3 is a cross-sectional view of the liquid crystal display of FIG. 2 taken along line III-III, FIG. 4 is a layout view of the liquid crystal display of FIG. 2 except for the pixel electrode, FIG. 5 is a top plan view of the pixel electrode and the data line in the liquid crystal display of FIG. 2, and FIG. 6 is a top plan view of an exemplary embodiment of a base electrode of a pixel electrode according to the present invention.

Referring to FIG. 2 to FIG. 5, a liquid crystal display according to an exemplary embodiment of the present invention includes the lower panel 100 and the upper panel 200 facing each other, and the liquid crystal layer 3 interposed between the two display panels 100 and 200.

Firstly, the lower panel 100 will be described.

A plurality of a gate line 121 and a plurality of a storage electrode line are disposed on an insulating substrate 110.

The gate lines 121 transmit gate signals and substantially extend in a transverse direction. Each gate line 121 includes a plurality of a first and a second gate electrodes 124a and 124b. In the layout view of FIG. 2, the first gate electrode 124a and the second gate electrode 124b protrude upward (e.g., in a longitudinal direction), extended from a single gate line GL.

Each storage electrode line includes a stem 131 extending substantially parallel to the gate lines 121, and a plurality of a storage electrode 135, each extended from a single one of the stem 131. Each storage electrode 135 protrudes downward (e.g., in the longitudinal direction) toward a gate line GL. Each storage electrode 135, otherwise referred to as a "branch," extends substantially perpendicular from the stem 131.

A gate insulating layer 140 is disposed on the gate lines 121 and the storage electrode lines 131 and 135. The gate insulating layer 140 is disposed opposite to the insulating substrate 110, with respect to the gate lines 121 and the storage electrode lines 131 and 135. The gate insulating layer 140 may overlap an entire of the insulating substrate 110, or a whole of the gate lines 121 and the storage electrode lines 131 and 135, upon which the gate insulating layer 140 is disposed.

A plurality of first semiconductors 154a and 154b preferably made of amorphous or crystallized silicon are disposed on the gate insulating layer 140, opposing the first and second gate electrodes 124a and 124b with respect to the gate insulating layer 140. In an exemplary embodiment, the semiconductors 154a and 154b may preferably include amorphous or crystallized silicon.

A pair of a plurality of ohmic contacts 163a/163b and 165a/165b are respectively disposed on the first semiconductors 154a and 154b. In an exemplary embodiment, the ohmic contacts 163a, 163b, 165a, and 165b may include a material such as n+ hydrogenated amorphous silicon in which an n-type impurity is doped with a high concentration, or of silicide.

A plurality of a data line 171a and 171b, and a plurality of a first and a second drain electrode 175a and 175b are respectively disposed on and overlapping the ohmic contacts 163a, 163b, 165a, and/or 165b, and on and overlapping the gate insulating layer 140.

The data lines 171a and 171b transmit data signals, extend substantially in the longitudinal direction, and cross both the gate lines 121 and the stems 131 of the storage electrode lines. Each data line 171a/171b includes a plurality of a first/second source electrodes 173a/173b. Each of the first/second source electrodes 173a/173b respectively extends toward the first/ second gate electrodes 124a/124b, and is curved with a substantially "U" shape in the layout view. The first/second source electrodes 173a/173b are respectively disposed opposite to the first/second drain electrodes 175a/175b, with respect to the first/second gate electrodes 124a/124b.

Referring to the layout view in FIG. 2, each of the first and second drain electrodes 175a and 175b includes a first (distal) end and a second end. The first (distal) end of the first and second drain electrodes 175a and 175b is enclosed by the first/second source electrode 173a/173b. From the first (distal) end, the respective first/second drain electrode 175a/175b extends upward in the longitudinal direction to the second end. The second end of the first/second drain electrode 175a/175b may have a relatively wide area for connection with another layer. A width of the second end of the first and second drain electrodes 175a and 175b may be taken in the transverse direction, and be larger than a width of the first (distal) end taken in the same transverse direction. The first and second drain electrodes 175a and 175b may include first to third portions, each having a different width, as illustrated in FIG. 2.

However, in alternative embodiments, the shapes and/or arrangement of the first and second drain electrodes 175a and 175b, and of the data lines 171a and 171b may be modified in various forms.

A first/second gate electrode 124a/124b, a first/second source electrode 173a/173b, and a first/second drain electrode 175a/175b together respectively form a first/second thin film transistor ("TFT") Qa/Qb, along with a first/second semiconductor 154a/154b. A channel of the first/second thin film transistor Qa/Qb is disposed on the first/second semiconductor 154a/154b, and is disposed between pairs of the first/second source electrode 173a/173b and the first/second drain electrode 175a/175b, respectively.

The pair of ohmic contacts 163b/165b are interposed only between the underlying semiconductor island 154b, and the overlying data line 171b and drain electrode 175b, and reduce contact resistance between the semiconductor island 154b, the date line 171b and the drain electrode 175b. The pair of ohmic contacts 163b/165b are interposed only between the underlying semiconductor island 154b, and the overlying data line 171b and drain electrode 175b, and reduce contact resistance between the semiconductor island 154b, the date line 171b and the drain electrode 175b. The pair of ohmic contacts 163a/165a may be interposed only between the underlying semiconductor island 154a, and the overlying data line 171a and drain electrode 175a, and reduce contact resistance between the semiconductor island 154a, the date line 171a and the drain electrode 175a.

Referring to the layout view of FIG. 2, each of the semiconductors 154a and 154b includes a first portion exposed without being covered by the data lines 171a and 171b and the drain electrodes 175a and 175b, respectively, and a second portion between the source electrodes 173a and 173b and the drain electrodes 175a and 175b. The first portion of the semiconductors 154a and 154b may be disposed at peripheral edges of the semiconductors 154a and 154b in the layout view.

A lower passivation layer 180p is disposed on the data lines 171a and 171b, the drain electrodes 175a and 175b, and the exposed portions of the semiconductors 154a and 154b. In an exemplary embodiment, the lower passivation layer 180p may preferably include silicon nitride or silicon oxide. The lower passivation layer 180p may directly contact all of the data lines 171a and 171b, the drain electrodes 175a and 175b, the exposed portions of the semiconductors 154a and 154b and an upper surface of the gate insulating layer 140.

A plurality of a light blocking member 220 are separated by a predetermined interval from each other and are disposed directly on and contacting an upper surface of the lower passivation layer 180p. The light blocking member 220 may hereinafter be referred to as a black matrix. Referring to the layout view of FIG. 2, each of the light blocking members 220 may include a first (stripe) portion extending upward and downward in the longitudinal direction, and a second (quadrangle) portion corresponding to the thin film transistors. The second portion of the light blocking member 220 may overlap with an entire of the semiconductors 154a and 154b, the distal end of the drain electrodes 175a and 175b, and the "U" shaped portion of the source electrodes 173a and 173b . In a cross-sectional view, the light blocking members 220 may overlap an entire of the data lines 171a and 171b, or a portion thereof. The light blocking members 220 reduce or effectively prevent light leakage.

A plurality of a color filter 230 is disposed directly on and contacting both the lower passivation layer 180p and the light blocking members 220. In an exemplary embodiment, the color filters 230 are mostly disposed in a region surrounded by the light blocking members 220. The color filters 230 include a plurality of holes 235a and 235b, disposed on and overlapping the first and second drain electrodes 175a and 175b. An entire of a width of the holes 235a and 235b overlaps a portion of the first and second drain electrodes 175a and 175b, respectively.

The lower passivation layer 180p may reduce or effectively prevent pigments of the color filter 230 from flowing into the exposed semiconductors 154a and 154b.

An upper passivation layer 180q is disposed directly on the lower passivation layer 180p, the light blocking members 220 and the color filters 230. In an exemplary embodiment, the upper passivation layer 180q may include an inorganic insulating material, such as silicon nitride or silicon oxide. The upper passivation layer 180q reduces or effectively prevents the color filters 230 from lifting (e.g., separating from other layers). The upper passivation layer 180q may also suppress contamination of the liquid crystal layer 3 by organic materials, such as a solvent flowing from the color filters 230, advantageously reducing or effectively preventing defects such as an afterimage which may be generated during driving of the LCD.

In an alternative embodiment, at least one of the light blocking members 220 and the color filters 230 may be disposed on the upper panel 200, instead of being on the lower panel as illustrated in FIG. 3. Additionally, one of the lower passivation layer 180p and the upper passivation layer 180q of the lower panel 100 may be omitted in this case.

Referring again to FIGS. 2 and 3, the upper passivation layer 180q and the lower passivation layer 180p include a plurality of a contact hole 185a and 185b, respectively exposing the first and second drain electrodes 175a and 175b. Each of the contact holes 185a and 185b in the upper passivation layer 180q is aligned with the contact holes 185a and 185b in the lower passivation layer 180p, respectively. The contact holes 185a and 185b may also be aligned with the holes 235a and 235b in the color filters 230.

A plurality of pixel electrodes 191 are disposed directly on and contacting an upper surface of the upper passivation layer 180q. The above-described color filters 230 may be extended according to a column of the pixel electrodes 191. Also, each of the branches 135 of the storage electrode lines are disposed substantially between a pixel electrode 191 adjacent to the data line 171a, and the same pixel electrode 191 adjacent to the data line 171b. The pixel electrode 191 may be disposed substantially between the branches 135 of the storage lines, as illustrated in the layout view of FIG. 2.

Referring to FIG. 5, each pixel electrode 191 includes a first subpixel electrode 191a and a second subpixel electrode 191b. Adjacent first and second subpixel electrodes 191a and 191b are separated from each other with a gap 91 of a substantially quadrangular belt shape therebetween. The gap 91 is extended in the transverse direction. The first and second subpixel electrodes 191a and 191b respectively include a basic electrode 199 shown in FIG. 6, or at least one modification thereof.

Next, the basic electrode 199 will be described in detail with reference to FIG. 6.

As shown in FIG. 6, the overall whole shape of the basic electrode 199 is a quadrangle. The basic electrode 199 includes a cross-shaped stem. The cross-shaped stem includes a first (transverse stem) 193 and a second (longitudinal) stem 192 cross the first transverse stem 193. The first stem 193 may intersect the second stem 192 to be substantially perpendicular to the second stem 192.

The basic electrode 199 is divided into a first subregion Da, a second subregion Db, a third subregion Dc, and a fourth subregion Dd by the transverse stem 193 and the longitudinal stem 192. Each of the subregions Da-Dd may include a plurality of first to fourth minute branches 194a, 194b, 194c, and 194d, respectively.

The first minute branch 194a obliquely extends from the transverse stem 193 or the longitudinal stem 192 in the upper-left direction, and the second minute branch 194b obliquely extends from the transverse stem 193 or the longitudinal stem 192 in the upper-right direction. Also, the third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction. The minute branches 194a, 194b, 194c, and 194d, the transverse stem 193 and the longitudinal stem 192 together form a single, continuous and indivisible basic electrode 199.

In an exemplary embodiment, the first to fourth minute branches 194a-194d may form an angle of about 45 degrees or 135 degrees with the gate lines 121 or the transverse stem 193. In an alternative embodiment, the minute branches 194a-194d of two neighboring subregions Da-Dd may be crossed, such as to be disposed substantially perpendicular to each other. Each of the minute branches 194a-194d includes a longitudinal extension direction which is substantially parallel with an elongated length of the minute branches 194a-194d. A width of the minute branches 194a-194d is taken substantially perpendicular to the longitudinal extension direction. In one exemplary embodiment, the width of each of the minute branches 194a-194d may be in a range of about 2.5 micrometers (μm) to about 5.0 micrometers (μm). An interval between adjacent minute branches within a subregion may also be taken substantially perpendicular to the longitudinal extension direction. The interval between the neighboring minute branches 194a-194d within one or more of the subregions Da-Dd may be in a range of about 2.5 μm to about 5.0 μm.

Again referring to FIG. 2 to FIG. 5, each of the first and second subpixel electrodes 191a and 191b include at least one basic electrode 199. However, the minute branches 197 of the basic electrode 199 collectively forming the second subpixel electrode 191b are longer than the minute branches 195 of the first subpixel electrode 191a, such that the planar area occupied by the second subpixel electrode 191b is larger than the planar area occupied by the first subpixel electrode 191a, relative to the whole pixel electrode 191. The minute branches 195, a transverse stem and a longitudinal stem 192 of the first subpixel electrode 191a together form a single, continuous and indivisible first subpixel electrode 191a.

The second subpixel electrode 191b may include a pair of longitudinal expansions 196. The longitudinal expansions 196 are continuously connected to a remainder of the second subpixel electrode 191b, such as to collectively form a single, continuous and indivisible second subpixel electrode 191b. One longitudinal expansion 196 is disposed between the data line 171a and the branch 135 (e.g., right branch 135 in FIG. 5) of the storage electrode line. The other longitudinal expansion 196 is disposed between data line 171b and the branch 135 (e.g., left branch in FIG. 5) of the storage electrode line. One of the pair of longitudinal expansions 196 includes a protruded portion which is connected to another layer of the lower panel 100. Referring to FIG. 3, the protruded portion of the longitudinal expansion 196 of the second subpixel electrode 191b, may be electrically and physically connected to the drain electrode 175b through the contact hole 185b.

In an exemplary embodiment, the area of the second subpixel electrode 191b may be approximately 1.0 to 2.2 times the area of the first subpixel electrode 191a.

In FIGS. 2 and 5, a first longitudinal stem of the first subpixel electrode 191a and a second longitudinal stem of the second subpixel electrode 191b, are unmatched. In the drawings, the first longitudinal stem is disposed more to the left (in the transverse direction) than the second longitudinal stem, the longitudinal stems are not aligned with each other in the transverse direction. Within each of the first subpixel electrode 191a and the second subpixel electrode 191b, the respective longitudinal stem may be substantially centered along the transverse direction of the subpixel electrode.

A distance between each of right and left longitudinal edges of the second subpixel electrode 191b and a respective neighboring data line 171a and 171b, are substantially the same, as illustrated in FIG. 5. In contrast, a distance D1 and D2 between right and left longitudinal edges of the first subpixel electrode 191a and a respective neighboring data line 171a and 171b, are different.

As illustrated in FIG. 5, while a boundary of a whole of the pixel electrode 191 including sub-parts (e.g., subpixel electrodes 191a and 191b) is disposed substantially symmetrical in the transverse direction with respect to the adjacent data lines 171a and 171b, a portion of the whole of the pixel electrode 191 is disposed asymmetrical (e.g., offset) in the transverse direction with respect to the adjacent data lines 171a and 171b. The offset portion, first subpixel electrode 191a, of the pixel electrode 191 is not only disposed asymmetrical in the transverse direction with respect to the adjacent data lines 171a and 171b, but is also disposed asymmetrical with respect to the longitudinal expansions of the second subpixel electrode 191b.

The distance D1 between an inner boundary (e.g., in layout view) of the data line 171a connected to the first subpixel electrode 191a, and the (right) longitudinal edge of the neighboring first subpixel electrode 191a, is larger than the distance D2 between an inner boundary of the data line 171b connected to the second subpixel electrode 191b, and the (left) longitudinal edge of the neighboring first subpixel electrode 191a. In an exemplary embodiment, the distance D1 is larger than the distance D2 in the transverse direction, and may be less than two times the distance D2. In one exemplary embodiment, it may be preferable that the distance D1 is more than approximately 6 μm.

Each first/second subpixel electrode 191a/191b is physically and electrically connected to the first/second drain electrode 175a/175b through the contact hole 185a/185b, and receives data voltages from the first/second drain electrode 175a/175b.

An alignment layer 11 is disposed on the pixel electrode 191. The alignment layer 11 may define an uppermost layer of the lower panel 100, and be disposed directly adjacent to the liquid crystal layer 3.

Next, the upper panel 200 will be described.

The common electrode 270 is disposed on an insulating substrate 210, and an alignment layer 21 is disposed thereon. The common electrode 270 may be disposed directly on the insulating substrate 210, and overlapping substantially an entire of the insulating substrate 210. The alignment layer 21 may be disposed directly on the common electrode 270 and opposite to the insulating substrate 210 with respect to the common electrode 270. The alignment layer 21 may overlap substantially an entire of the common electrode 270.

In an exemplary embodiment, each of the alignment layers 11 and 21 may be a vertical alignment layer.

In one exemplary embodiment, polarizers (not shown) may be provided on each outer surface of the display panels 100 and 200, respectively.

The liquid crystal layer 3 interposed between the lower panel 100 and the upper panel 200, and includes liquid crystal molecules having negative dielectric anisotropy.

In the illustrated embodiment, the liquid crystal molecules are aligned perpendicular to the surface of the two display panels 100 and 200.

If the gate lines 121 are applied with the gate signals, the data voltage is applied to the first and second subpixel electrodes 191a and 191b through the data lines 171a and 171b. Then, the first and second subpixel electrodes 191a and 191b applied with the data voltage and the common electrode 270 is applied with the common voltage generate an electric field to the liquid crystal layer 3. Accordingly, the liquid crystal molecules of the liquid crystal layer 3 are arranged in response of the electric field, such that the major axes of the liquid crystal molecules tend to change direction to be substantially perpendicular to the direction of the electric field. The change in degree of polarization of light incident to the liquid crystal layer 3 is affected depending on the inclination degree of the liquid crystal molecules. The change of the polarization is affected with a change of transmittance by a polarizer, and thereby a liquid crystal display displays images.

On the other hand, the edges of the minute branches 194a-194d within the basic electrode 199 shape distort the electric field to make horizontal components of the electric field perpendicular to the edges of the minute branches 194a-194d. The inclination direction of the liquid crystal molecules is the direction determined by the horizontal components.

The liquid crystal molecules firstly tend to tilt in the direction perpendicular to the edges of the minute branches 194a-194d. However, the directions of the horizontal components of the electric field near the neighboring minute branches 194a-194d are opposite to each other, and the intervals between the minute branches 194a-194d are relatively narrow such that the liquid crystal molecules tending to arrange in the opposite directions, are tilted in the direction parallel to the length (longitudinal extension) direction of the minute branches 194a-194d.

In an exemplary embodiment of the present invention, the length directions in which the minute branches 194a-194d are extended in one pixel PX, are four various directions, such that the inclined directions of the liquid crystal molecules are in these same various four directions. Therefore, the viewing angle of the liquid crystal display is widened by varying the inclined directions of the liquid crystal molecules.

When the first subpixel electrode 191a and the second subpixel electrode 191b are applied with different data voltages through the different data lines 171a and 171b, the voltage of the first subpixel electrode 191a having the relatively small area, is higher than the voltage of the second subpixel electrode 191b having the relatively large area.

In this way, if the voltages of the first sub-pixel electrode 191a and the second sub-pixel electrode 191b are different from each other, the voltage applied to the first liquid crystal capacitor Clca disposed between the first sub-pixel electrode 191a and the common electrode 270, and the voltage applied to the second liquid crystal capacitor Clcb disposed between the second sub-pixel electrode 191b and the common electrode 270 are different from each other such that the declination angle of the liquid crystal molecules of the subpixels PXa and PXb may be different from each other. As a result, the luminance of the two subpixels become different. Accordingly, if the voltages of the first and second liquid crystal capacitors Clca and Clcb are appropriately controlled, the images shown at the side may be approximate to the images shown at the front. Stated another way, the gamma curve of the side may be approximately close to the gamma curve of the front, thereby improving the side visibility.

In one exemplary embodiment, the liquid crystal display according to the present invention is driven by column inversion.

Figure 7:
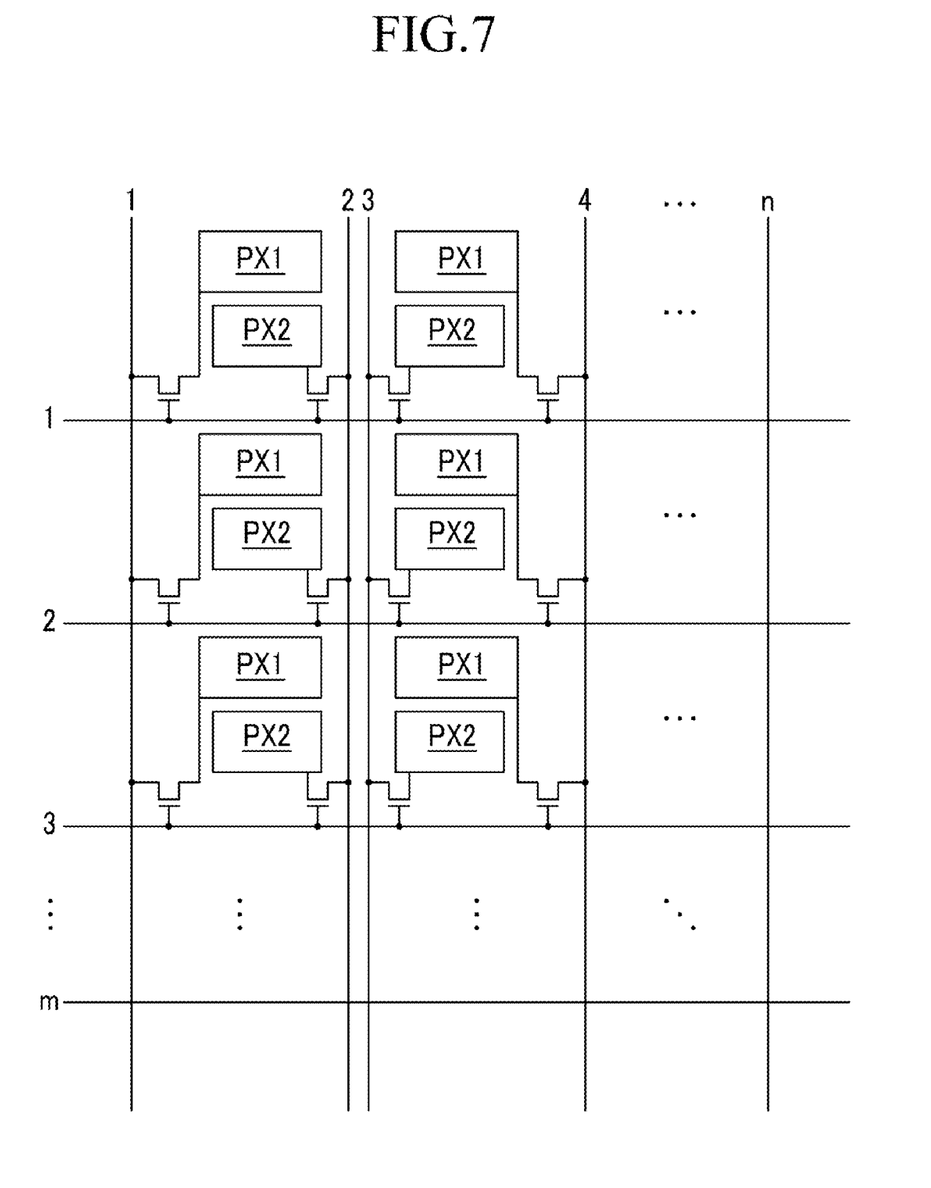
FIG. 7 is a top plan view of an exemplary embodiment of a pixel of a liquid crystal display, according to the present invention, and a polarity of a signal input to the pixel.

FIG. 7 is a top plan view of an exemplary embodiment of a pixel of a liquid crystal display according to the present invention, and a polarity of a signal input to the pixel.

As shown in FIG. 7, a signal having the same polarity is input to a plurality of a data line "n" during one frame 1H, and the opposite polarity is input for the neighboring (e.g., immediately adjacent) data line. In an exemplary embodiment of the present invention, the signal having the same polarity is input during one frame 1H, however the first subpixel electrode 191a and the second subpixel electrode 191b are respectively connected to the neighboring data lines 171a and 171b, such that the apparent polarity of the first subpixel electrode 191a and the second subpixel electrode 191b is the dot inversion.

In the illustrated exemplary embodiment of the present invention, the distances D1 and D2 between the right and left longitudinal edges of the first subpixel electrode 191a, and the respective data line 171a and 171b neighboring the two longitudinal edges of the first subpixel electrode 191a, are substantially asymmetrical such that the crosstalk generated by the difference of the parasitic capacitance of the first subpixel electrode 191a and the neighboring data lines 171a and 171b may be reduced or effectively prevented. The first subpixel electrode 191a may be applied with a higher voltage than the second subpixel electrode 191b.

When the thin film transistor connected to the first subpixel electrode 191a is disposed relatively close to one of the data lines 171a and 171b, such that the difference of the parasitic capacitance at the left and right of the first subpixel electrode 191a is generated by the parasitic capacitance of the thin film transistor, the crosstalk is generated. However, in an exemplary embodiment of the present invention, the respective interval distances between the right and left longitudinal edges of the first subpixel electrode and two neighboring data lines, are different such that the difference of the parasitic capacitances by the thin film transistor may be offset.

Figure 8:
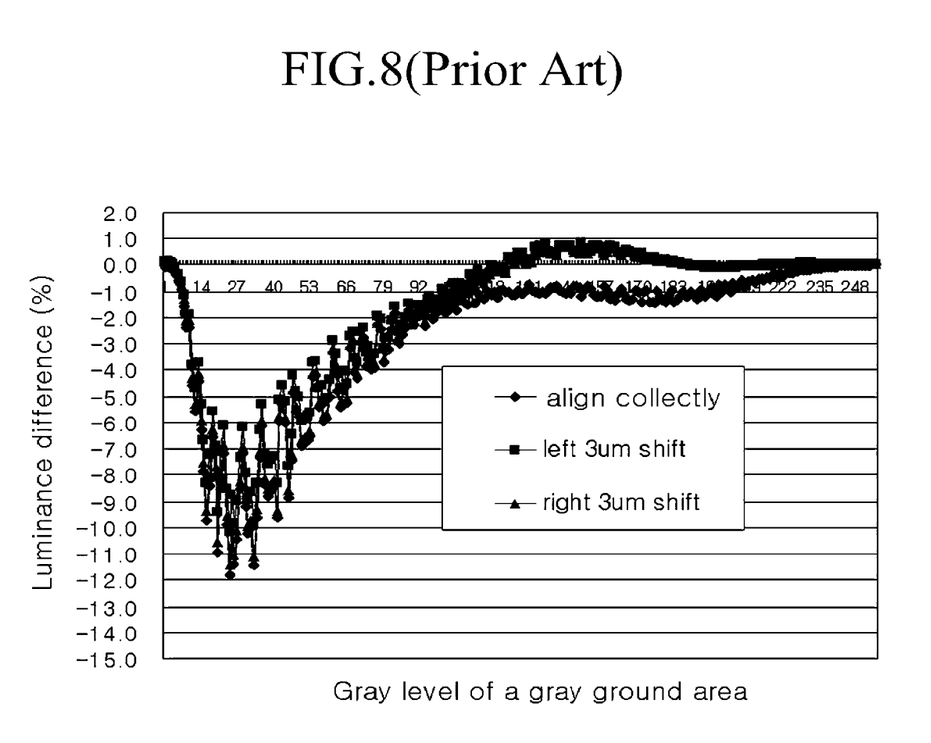
FIG. 8 is a graph illustrating V-CT according to the conventional art.
Figure 9:
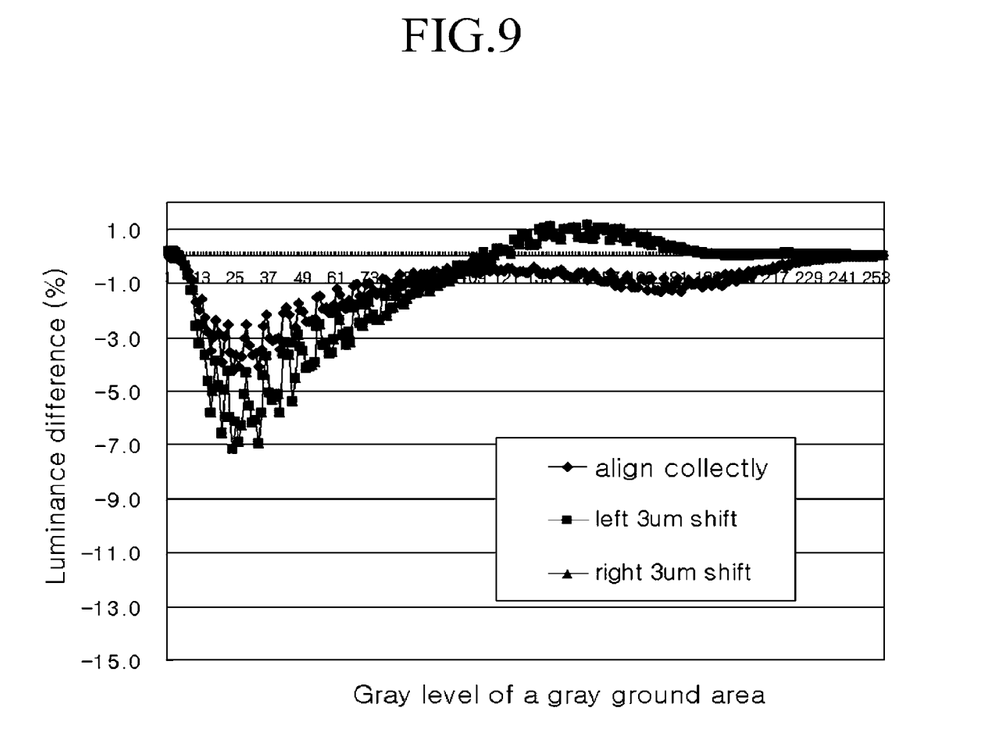
FIG. 9 is a graph illustrating V-CT according to an exemplary embodiment of the present invention.

An effect of the respective interval distances between the right and left longitudinal edges of the first subpixel electrode and two neighboring data lines being different and offsetting the difference of the parasitic capacitances is evidenced through graphs of FIG. 8 and FIG. 9.

FIG. 8 is a graph illustrated V-CT according to the conventional art, and FIG. 9 is a graph illustrating V-CT according to an exemplary embodiment of the present invention.

Figure 11:
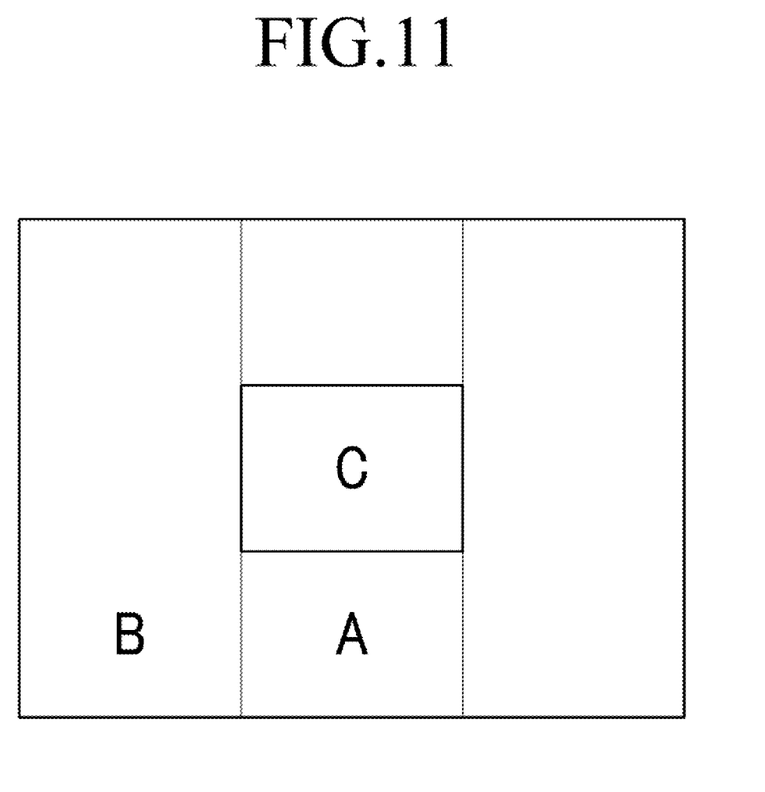
FIG. 11 is an image pattern in a liquid crystal display for testing the crosstalk phenomenon.

Referring to FIG. 11, an image pattern for testing a crosstalk is has a pattern displaying a white quadrangular shape C on the central portion of a gray ground area. The luminance difference is a luminance difference between an area A and an area B next to the area A of the gray ground area. At this time, the area A is positioned below the white quadrangular shape C.

FIG. 8 shows a case in which the respective distances between the right and left longitudinal edges of the first subpixel electrode, and two neighboring data lines are the same, and FIG. 9 show a case in which the respective distances between the right and left longitudinal edges of the first subpixel electrode and two neighboring data lines are asymmetric.

FIG. 8 represents conventional art, where the pixel electrode and the data line are aligned, without a misalignment of the first subpixel electrode. FIG. 9 represents an exemplary embodiment of the present invention where right and left movement of the longitudinal edges of the subpixel electrode of about 3 μm. As shown in FIG. 8, V-CT is more than 12% according to the conventional art, and thereby the deviation is largely generated. However, as shown in FIG. 9, although the right and left movements of 3 μm are generated, substantially the same V-CT values may be obtained in comparison to the conventional art, and the V-CT value is decreased by 7.5% compared with FIG. 8.

The above illustrated embodiments include the pixel electrode including two subpixel electrodes. However, the present invention is not limited thereto, and pixel electrode may not be divided.

Figure 10:
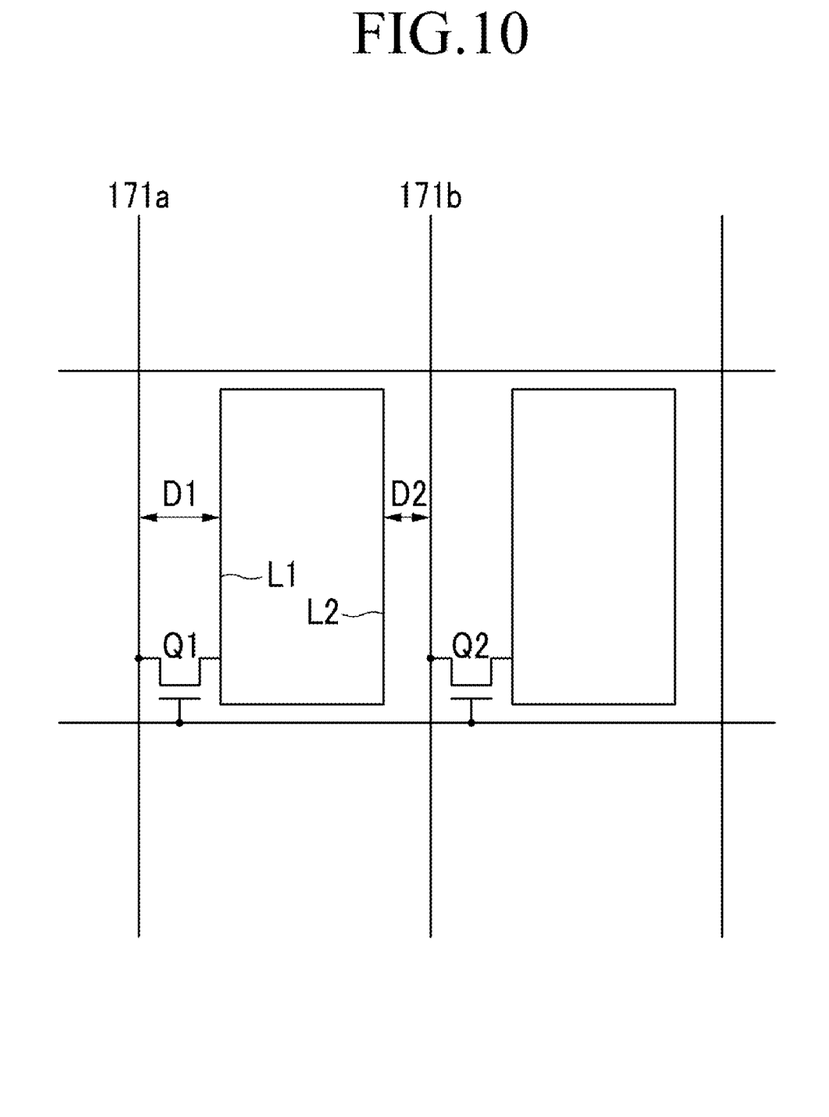
FIG. 10 is a top plan view of another exemplary embodiment of a liquid crystal display according to the present invention.

FIG. 10 is a top plan view of another exemplary embodiment of a liquid crystal display according to the present invention.

Referring to FIG. 10, the pixel electrode 191 may include a first longitudinal edge L1 disposed adjacent and close to the corresponding data line 171a connected to the thin film transistor Q1 connected to the pixel electrode 191. The pixel electrode 191 may include a second longitudinal edge L2 close to an adjacent data line 171b connected to the thin film transistor Q2 of the neighboring pixel. A first distance D1 between the first longitudinal edge L1 and the adjacent data line 171a, is larger than a second distance L2 between the second longitudinal edge L2 and the adjacent data line 171b. Boundaries of a whole of the pixel 191 not being divided into sub-parts, is disposed offset with respect to adjacent data lines. In an exemplary embodiment, the first distance D1 is less than two times the second distance D2.

While this invention has been described in connection with what is presently considered to be exemplary embodiments, it is to be understood that the invention is not limited to the illustrated embodiments, but, on the contrary, is intended to cover various modifications and equivalent arrangements included within the spirit and scope of the appended claims.

What is claimed is:

1. A liquid crystal display comprising:
   an insulation substrate;
   a plurality of gate lines and a plurality of data lines disposed on the insulation substrate and intersecting each other;
   a plurality of thin film transistors each connected to a gate line and a data line, wherein the thin film transistors comprise a first thin film transistor and a second thin film transistor;
   a plurality of pixel electrodes comprising a first subpixel electrode connected to the first thin film transistor and a second subpixel electrode connected to the second thin film transistor;
   wherein each first subpixel electrode includes:
      a first longitudinal edge extending in a longitudinal direction and disposed adjacent to a first data line connected to the first thin film transistor; and
      a second longitudinal edge extending in the longitudinal direction and disposed adjacent to a second data line adjacent to the first data line, the second data line connected to the second thin film transistor,
   wherein a first distance between the first longitudinal edge and an edge of the first data line is larger than a second distance between the second longitudinal edge and an edge of the second data line, and is less than two times the second distance and
   wherein a longitudinal central line of the first subpixel electrode is offset with respect to a longitudinal central line of the second subpixel electrode.

2. The liquid crystal display of claim 1, wherein
the polarity of a signal voltage applied to the data lines is changed per one frame.

3. The liquid crystal display of claim 2, wherein
the each pixel electrode is disposed symmetrical with respect to a longitudinal central line of a pixel area.

4. The liquid crystal display of claim 1, wherein
the first subpixel electrode and the second subpixel electrode are input with voltages having different polarities, respectively.

5. The liquid crystal display of claim 4, wherein
adjacent first subpixel electrodes in the transverse direction are input with voltages having the different polarities.

6. The liquid crystal display of claim 1, wherein
a third distance between a fifth longitudinal edge of the second subpixel electrode and the first data line is substantially the same as a fourth distance between a sixth longitudinal edge of the second subpixel electrode and the edge of the second data line,
the fifth longitudinal edge extending in the longitudinal direction and disposed adjacent to the first data line, and the sixth longitudinal edge extending in the longitudinal direction and disposed adjacent to the second data line.

7. The liquid crystal display of claim 1, wherein
the first subpixel electrode and the second subpixel electrode are disposed adjacent to each other in the longitudinal direction.

8. The liquid crystal display of claim 1, wherein
a difference between a voltage input to the first subpixel electrode and the reference voltage input to the common electrode, is larger than a difference between the voltage input to the second subpixel electrode and the reference voltage input to the common electrode.

9. The liquid crystal display of claim 8, wherein
the each pixel electrode further includes a plurality of a minute branch.

10. The liquid crystal display of claim 8, wherein
the second subpixel electrode has a second area that is larger than a first area of the first subpixel electrode in a layout view, the second area being about 1 to 2 times larger than the first area.

11. The liquid crystal display of claim 10, wherein the first and the second thin film transistors are both connected to a same gate line, and the first and the second thin film transistors are respectively connected to different data lines.

12. The liquid crystal display of claim 11, wherein the each pixel electrode further includes a plurality of a minute branch.

13. The liquid crystal display of claim 1, wherein the first subpixel electrode and the second subpixel electrode each include a plurality of a minute branch.

14. The liquid crystal display of claim 1, wherein the first distance is more than about 6 micrometers (μm).

15. A liquid crystal display comprising:

a first substrate including a plurality of pixel areas;

a plurality of gate lines and a plurality of data lines disposed on the first substrate and intersecting each other;

a plurality of thin film transistors each connected to a gate line and a data line, wherein the thin film transistors comprise a first thin film transistor and a second thin film transistor;

a plurality of pixel electrodes disposed on the first substrate, each pixel electrode comprises a first subpixel electrode connected to the first thin film transistor and a second subpixel electrode connected to the second thin film transistor, and includes:

a first subpixel electrode, including:

a first longitudinal edge extending in the longitudinal direction and disposed adjacent to a first data line connected to the first thin film transistor; and a second longitudinal edge extending in the longitudinal direction and disposed adjacent to a second data line adjacent to the first data line, the second data line connected to the second thin film transistor, the first and second pixel areas adjacent to each other, wherein a first distance between the first longitudinal edge and an edge of the first data line is larger than a second distance between the second longitudinal edge and an edge of the second data line, and is less than two times the second distance; and a second subpixel electrode adjacent to the first subpixel electrode in a longitudinal direction of the each pixel electrode, the second subpixel electrode disposed substantially symmetrical with respect to the adjacent data lines;

a common electrode disposed on a second substrate and facing the pixel electrodes; and a liquid crystal layer interposed between the pixel electrodes and the common electrode, wherein a longitudinal central line of the first subpixel electrode is offset with respect to a longitudinal central line of the second subpixel electrode.

16. The liquid crystal display of claim 15, wherein an entire of the first subpixel electrode is disposed between portions of the second subpixel electrode in the transverse direction.

* * * * *